Dec. 20, 1955     S. SILVER     2,727,238
POT HOLDER DEVICE
Filed June 14, 1954     2 Sheets-Sheet 1
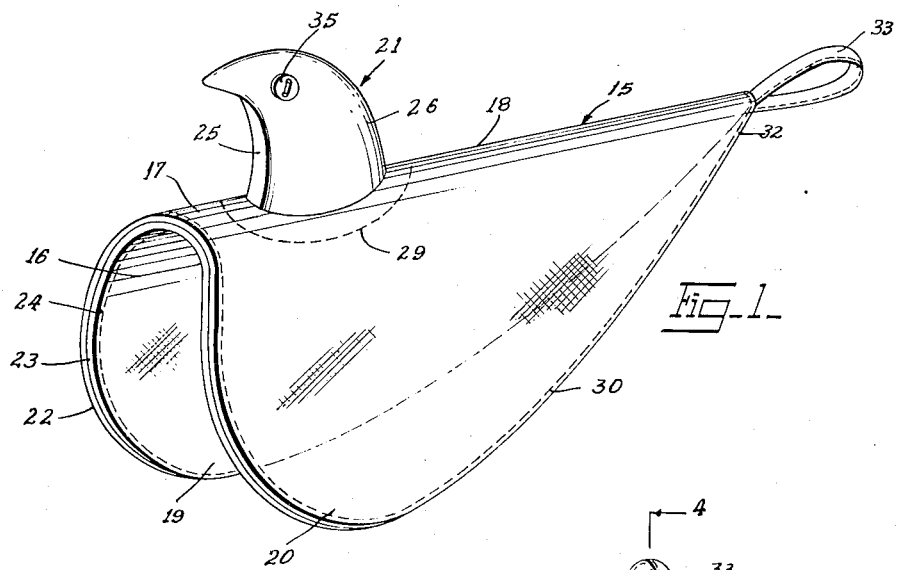
Fig. 1
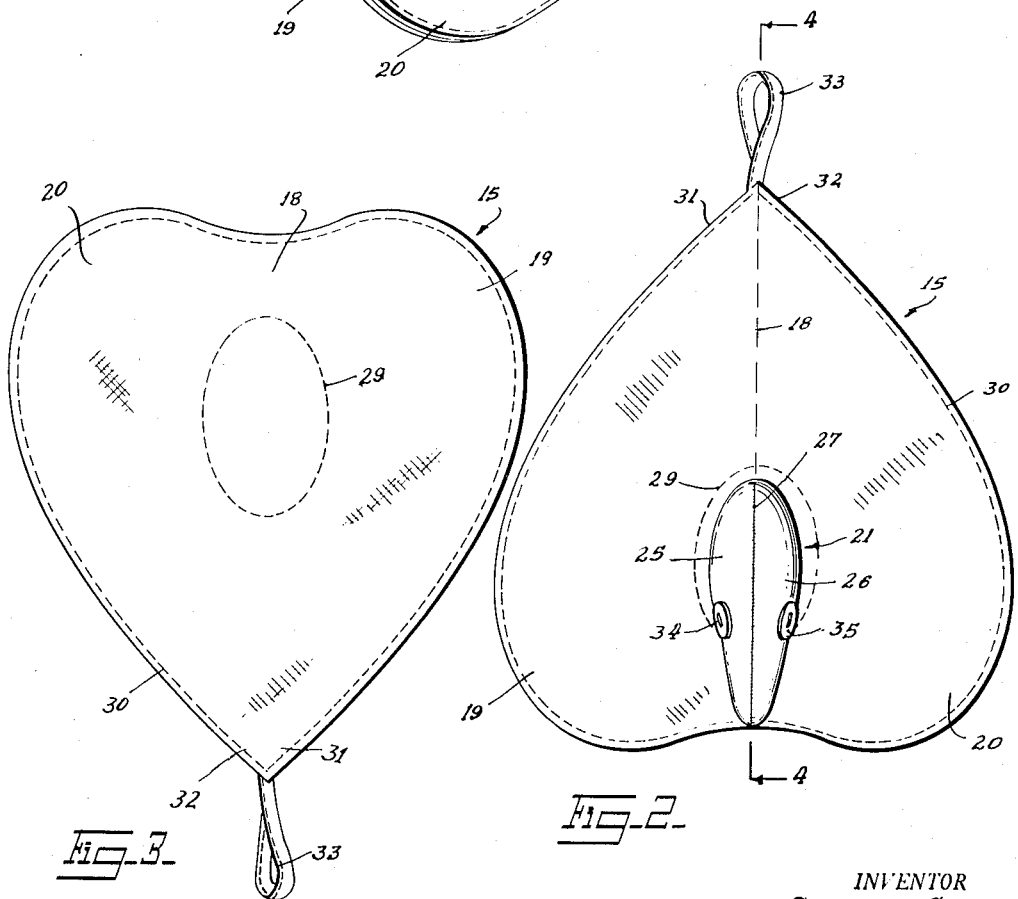
Fig. 3     Fig. 2
INVENTOR
SIGMUND SILVER
BY
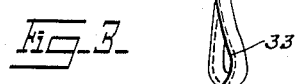
ATTORNEY Dec. 20, 1955 S. SILVER 2,727,238
POT HOLDER DEVICE
Filed June 14, 1954 2 Sheets-Sheet 2
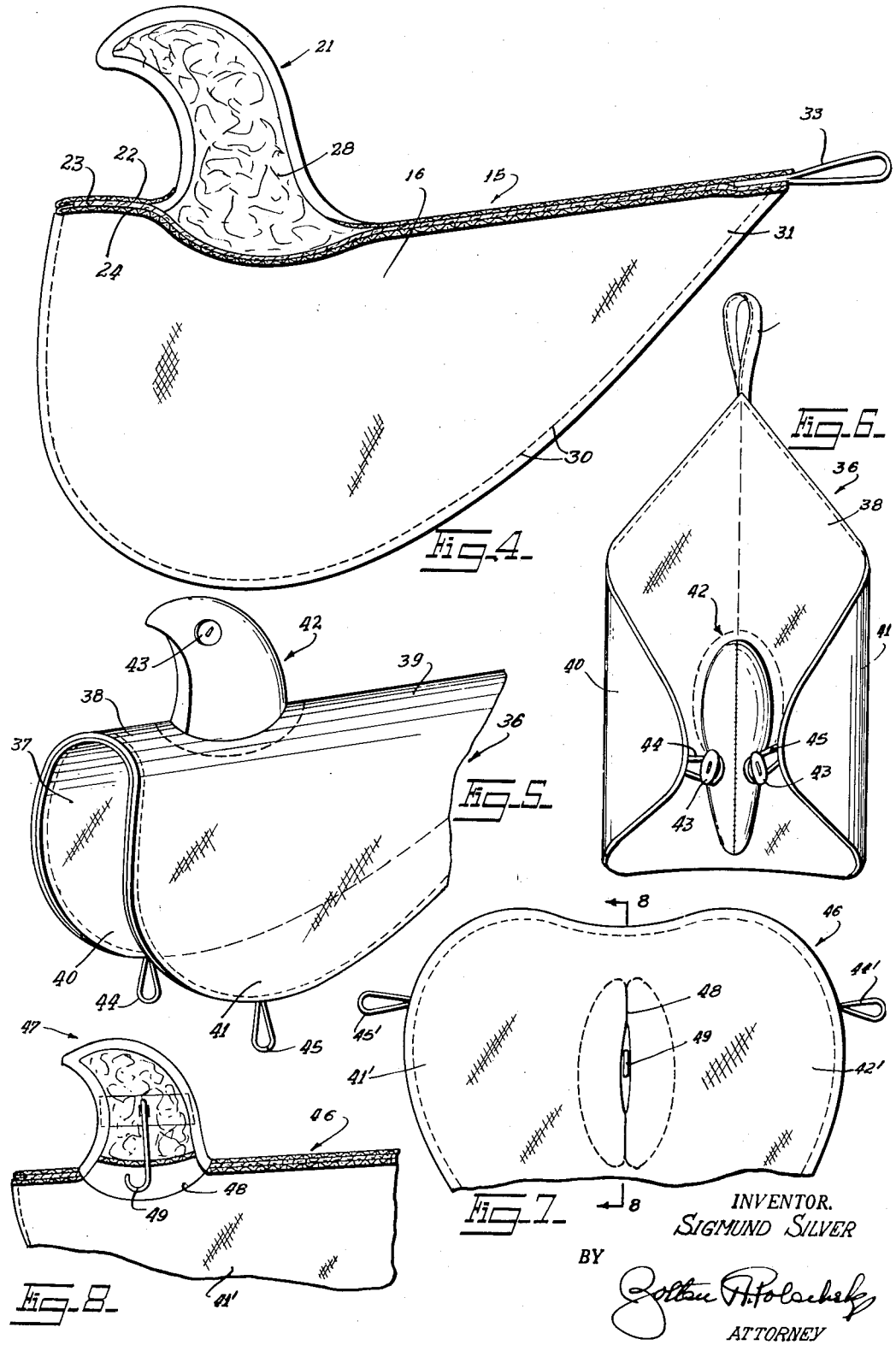
INVENTOR.
SIGMUND SILVER
BY
ATTORNEY United States Patent Office 2,727,238
Patented Dec. 20, 1955

2,727,238

POT HOLDER DEVICE

Sigmund Silver, New York, N. Y.

Application June 14, 1954, Serial No. 436,439

2 Claims. (Cl. 2—20)

This invention relates to new and useful improvements in pot holders.

More particularly, the present invention proposes the construction of a new and improved pot holder of attractive and novel appearance having a handle which can be gripped between the thumb and index finger with such thumb and finger as well as other fingers of the same hand free to manipulate the pad.

As a further object, the present invention proposes forming the pad with wing-shaped side portions and with the handle portion in the form of a bird head with a hanging loop for the pad at the juncture of the trailing edges of the wing-shaped side portions to resemble the tail of a bird.

Another object of the present invention proposes providing the bird head handle portion with buttons for eyes secured to each side of the handle portion and with button loops secured to the wing-shaped side portions of the pad to button the side portions of the pad around the hand of the user of the pad to protect such hand from steam and heat.

Still further, the present invention proposes forming the handle portion with a recess removably to receive a pot handle, lip, lid edge or the like.

The present invention further proposes to provide a hook in the handle recess to hold wire pot handles and the like.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a pot holder constructed and arranged in accordance with the present invention.

Fig. 2 is a top plan view of the structure shown in Fig. 1.

Fig. 3 is a bottom plan view of the structure shown in Figs. 1 and 2.

Fig. 4 is a sectional view taken on line 4—4 of Fig. 2.

Fig. 5 is a fragmentary view similar to Fig. 1 but illustrating a modification of the present invention.

Fig. 6 is a top plan view of the structure shown in Fig. 5 but with the side portions of the pad buttoned to the handle portion.

Fig. 7 is a fragmentary bottom plan view of structure similar to that shown in Figs. 5 and 6 but illustrating another modification of the present invention.

Fig. 8 is a fragmentary sectional view taken on line 8—8 of Fig. 7.

The pot holder in accordance with the first form of the invention illustrated in Figs. 1 to 4, inclusive, is a flat flexible insulated pad 15 having a front 16, back 17 and with central and side portions 18, 19 and 20. A stiffly flexible upright handle member 21 is secured at one end to the pad 15 and extends from the back 17 of the pad in the central portion 18 of the pad.

Pad 15 may be made of any number of laminations. As shown, pad 15 is formed of three sheets 22, 23, 24, the sheet 23 being of insulating material such as asbestos, padding cloth or the like.

Handle member 21 is formed of two sheets 25 and 26 of flexible material such as cloth sewn or otherwise secured together along seam 27 and stuffed with insulating material 28 so that it is substantially oval in cross section for substantially its full length. The two sheets 25 and 26 of the handle member 21 are secured as by stitching to the sheet 22 of the pad and the three sheets 22, 23 and 24 of the pad are all secured together by stitches 29 around the handle portion and by marginal stitches 30. The sheets 22, 23 and 24 may also be quilted together if desired.

Handle member 21 is formed in the shape of a bird head, such as the chicken head shown and side portions 19 and 20 of pad 15 are formed in wing shape with their trailing edges 31 and 32 joining together at the rear of the handle member 21. A hanging loop 33 is secured to the pad 15 at the trailing edge juncture of the wing-shaped side portions to resemble the tail of a bird.

The bird-head shape of handle member 21 is so disposed and its oval cross sectional shape is of a size so as to make it possible to grip the handle with one hand between the thumb and index finger with the thumb and fingers free to rest upon the side portions of the pad to manipulate the pad. Buttons 34 and 35 are secured to the handle member 21 at each side thereof to resemble eyes.

The modification of the invention illustrated in Figs. 5 and 6 is characterized by the provision of a pad 36 having a front 37, back 38, central and side portions 39, 40 and 41 and a flexible upright handle member 42 secured at one end to the pad 36 in the central portion 39 at the back 38 of the pad. Buttons 43 are secured to the handle member 42 at each side thereof and the handle member 42 is in the shape of a bird head with the buttons 43 simulating eyes thereof. A hanging loop 44 simulating a tail is secured to the pad 36 at the trailing edge juncture of the wing-shaped side portions 40 and 41. The pad 36 is constructed identical with pad 15 except for marginal loops 44 and 45 on wing-shaped side portions 40 and 41 of pad 36. The buttons 42 and 43 on the handle portion 42 serve as fastener elements and the marginal loops 44 and 45 are coacting fastener elements so as to fasten edge portions of the wing-shaped side portions 40 and 41 to the handle portion 42 in the manner shown in Fig. 6. This protects the user of the pad from having his hand burnt by steam, flame or dry heat.

The modification of the present invention illustrated in Figs. 7 and 8 is characterized by the provision of a pad 46 constructed similar to pad 36 described above and shown in Figs. 5 and 6 and with like parts bearing like reference numerals but primed to distinguish the figures. In addition, pad 46 has an upright handle member 47 with a recess 48 at its secured end extending from and through the front of the pad axially into the handle member. The recess 48 is adapted removably to receive pot handles, lips, lid edges and the like.

In the recess 48 and secured to the handle member 47 is a hook 49 which is adapted to hook and hold wire pot handles and the like.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A pot holder comprising a flat flexible insulated pad having a front and back and with central and side portions, a stuffed flexible upright handle member secured at one end to the pad and extending from the back of the pad in the central portion, said handle member being shaped and disposed for gripping with one hand between the thumb and index finger with the thumb and fingers free to rest upon the side portions of the pad, said upright handle member being oval in cross section substantially its full length and in the form of a bird head, said side portions of the pad being wing-shaped, and a hanging loop secured to the pad at the trailing edge juncture of the wing-shaped side portions, said handle member having a recess at the secured end thereof extending from and through the front of the pad axially into the handle member and adapted for receiving pot handles, lips, lid edges and the like, and a hook secured to the handle member and disposed in the recess to hold wire pot handles and the like.

2. A pot holder comprising a flat flexible insulated pad having a front and back and with central and side portions, a stuffed flexible upright handle member secured at one end to the pad and extending from the back of the pad in the central portion, said handle member being shaped and disposed for gripping with one hand between the thumb and index finger with the thumb and fingers free to rest upon the side portions of the pad, said upright handle member being in the form of a bird head and said side portions of the pad being wing-shaped, fastener elements on the sides of the handle member and fastener elements on the side portions removably to engage said fastener elements on the handle member, said fastener elements on the handle member being disposed to simulate eyes thereon, said handle member having a recess at the secured end thereof extending from and through the front of the pad axially into the handle member and adapted for receiving pot handles, lips, lid edges and the like, and a hook secured to the handle member and disposed in the recess to hold wire pot handles and the like.

References Cited in the file of this patent

UNITED STATES PATENTS

| 1,360,840 | White | Nov. 30, 1920 |
| 1,519,203 | Herndon | Dec. 16, 1924 |

FOREIGN PATENTS

| 11,914 | Great Britain | 1901 |